INVENTOR.
LESLIE C. IRWIN
BY
ATTORNEY

Aug. 30, 1960 L. C. IRWIN 2,950,828
MATERIAL DEFLECTOR FOR CAR DUMPERS
Filed Jan. 23, 1958 7 Sheets-Sheet 4

INVENTOR.
LESLIE C. IRWIN
BY
ATTORNEY.

Aug. 30, 1960 L. C. IRWIN 2,950,828
MATERIAL DEFLECTOR FOR CAR DUMPERS
Filed Jan. 23, 1958 7 Sheets-Sheet 7

Fig. 11.

INVENTOR.
LESLIE C. IRWIN
BY Roy E. Raney
ATTORNEY.

United States Patent Office 2,950,828
Patented Aug. 30, 1960

2,950,828

MATERIAL DEFLECTOR FOR CAR DUMPERS

Leslie C. Irwin, Fort William, Ontario, Canada, assignor to The Winter Dump Company Limited, a company of Canada Filed Jan. 23, 1958, Ser. No. 710,782

11 Claims. (Cl. 214—47)

The present invention relates to an improved material deflector for railway box car dumpers of the type which alternately up-end a car to cause the material therein to flow towards one end of the car and then the other, the deflector serving to divert the flowing material out opposite side doorways of the car and into a pit or the like. The invention is particularly suitable for use in dumpers of the type mentioned for unloading grain laden railway box cars.

A deflector has been proposed for the type of car dumpers mentioned comprising two baffle boards inserted through the opposite side doorways of the car to be emptied and positioned to form a V shhape deflector, the inner ends of the boards forming the apex and the outer ends engaging a side edge of the respective doorways so that the deflector divides the flowing material and diverts it out the doorways. The boards pivot at the apex so that the deflector may be reversed to divert material flowing from the other end of the car out of the doorways. The apex of this deflector was maintained fixed approximately in the plane of the center line of the doorways regardless of the reversal of positions of the baffle boards from one side of the doorways to the other to accommodate the reversal of direction of flows of material. One disadvantage of this prior deflector was that the angles of the baffle boards to the flow of material was so abrupt that the material adjacent the boards would cease to flow, requiring its manual removal from the car. A principal object of the present invention is the provision of an improved deflector of the general type mentioned in which the inner ends of the baffle boards forming the apex of the deflector may be shifted longitudinally of the car and well beyond either side of the plane of the center line of the doorways whereby the angles presented by the baffle boards to the flowing material in either direction can be materially reduced over that obtained by the prior structure described so that all of the material flows by gravity along the boards and out of the car.

A more specific object of the invention is the provision of an improved deflector structure of the type mentioned comprising two baffle boards carried by support structure operable to extend the boards through opposite side doorways of a box car or the like carrying granular material and which boards form a V shape deflector inside the car to divert material through the side door-ways as the material flows from one end of the car towards the other, the boards being hinged at their inner ends to the support structure to form the apex of the deflector with the legs arranged to swing from one edge to the other of the respective doorways upon reversal of the direction of flow material, the hinging means for the boards being shiftable longitudinally of the car to minimize the angle presented by the boards to the flowing material when the boards engage the door edges and thereby assure the gravitational flow of material along the baffle boards.

Another object of the invention is the provision of an improved deflector of the character referred to in which the hinging mechanism is movable by power means along a guide structure, preferably comprising a crane by which the baffle boards are moved into and out of the car, extending generally parallel with the centerline of the car, and means to indicate at a remote location to the guide structure a certain position of the hinging mechanism on the guide structure, such as the center position.

Another important object of the invention is the provision of an improved deflector of the type mentioned comprising two baffle boards carried by support structure, which may be in the form of a crane, arranged to extend the boards into opposite side doorways of a railway box car or the like and cooperate to form a V shape baffle for diverting granular material through the side doors as the material flows from one end of the car towards the other during alternate up-ending of the car, each board being supported by hinging means at its inner end so that the outer end of the board may swing from one edge of the doorway into which it extends to the other edge upon reversal in direction of flow material in the car, the hinging means for the boards cooperating to form a barrier preventing passage of grain between the hinged ends of the boards.

Other objects and advantages of the invention will be apparent from the following description of a preferred form of the invention, reference being made to the accompanying drawings wherein.

The present invention is particularly useful in a deflector for car dumpers of the type described in United States Patent No. 2,797,000, and to simplify explanation of the present invention, only a part of the dumper structure is shown here.

In the preferred form of the invention, two crane structures A, A' are mounted on opposite sides and at the center of a tilting railway car cradle indicated at B. The crane structures carry baffle boards C, C' respectively, and these baffle boards cooperate, when extended by their cranes into the respective side doorways of a box car D centered on the cradle B, to form a V shape deflector having the major planes of the baffle boards approximately normal to the car floor for diverting flowing material such as grain, out of the doorways and into a pit or the like below the track. The crane structures A, A' are alike and the baffle boards C, C' vary in but one respect; consequently, to avoid repetition and confusion, only the crane structure A is described in detail and only such parts of crane structure A' and its baffle board C' are shown as is necessary to an understanding of the invention.

Figure 1:
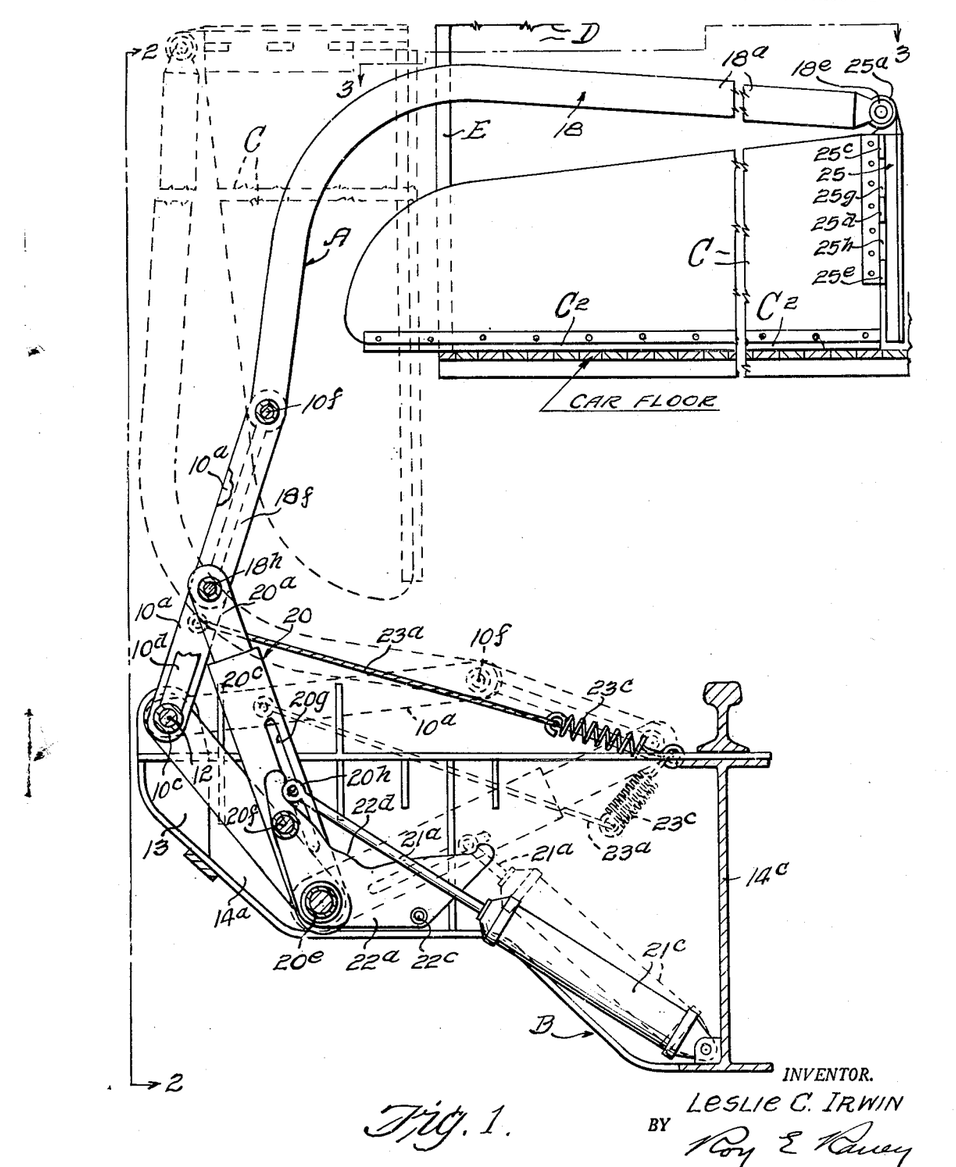
Fig. 1 is a sectional view of a crane structure and baffle board assembly embodying the invention mounted on a car dumper taken along line 1—1 of Fig. 2, only part of which dumper appears in the drawing and only a part of a box car is shown on the dumper preparatory to unloading.
Figure 2:
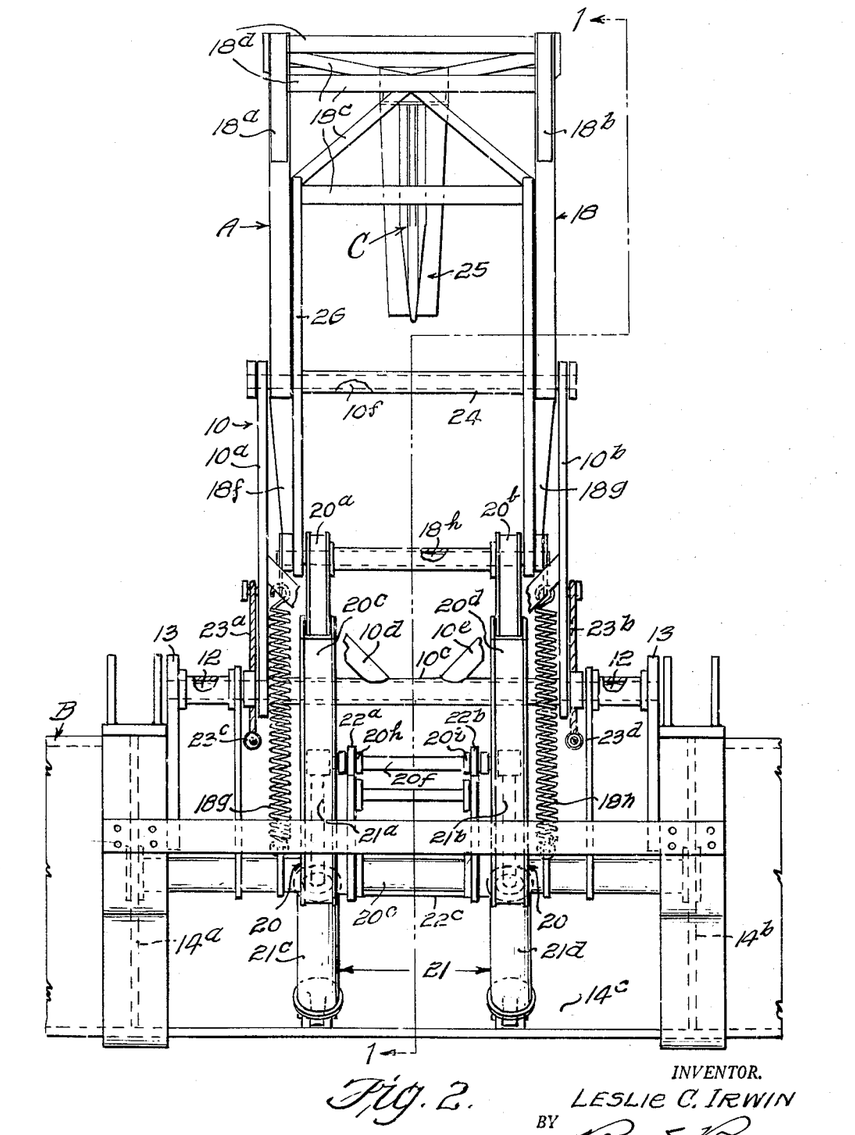
Fig. 2 is a view taken along substantially line 2—2 of Fig. 1.
Figure 3:
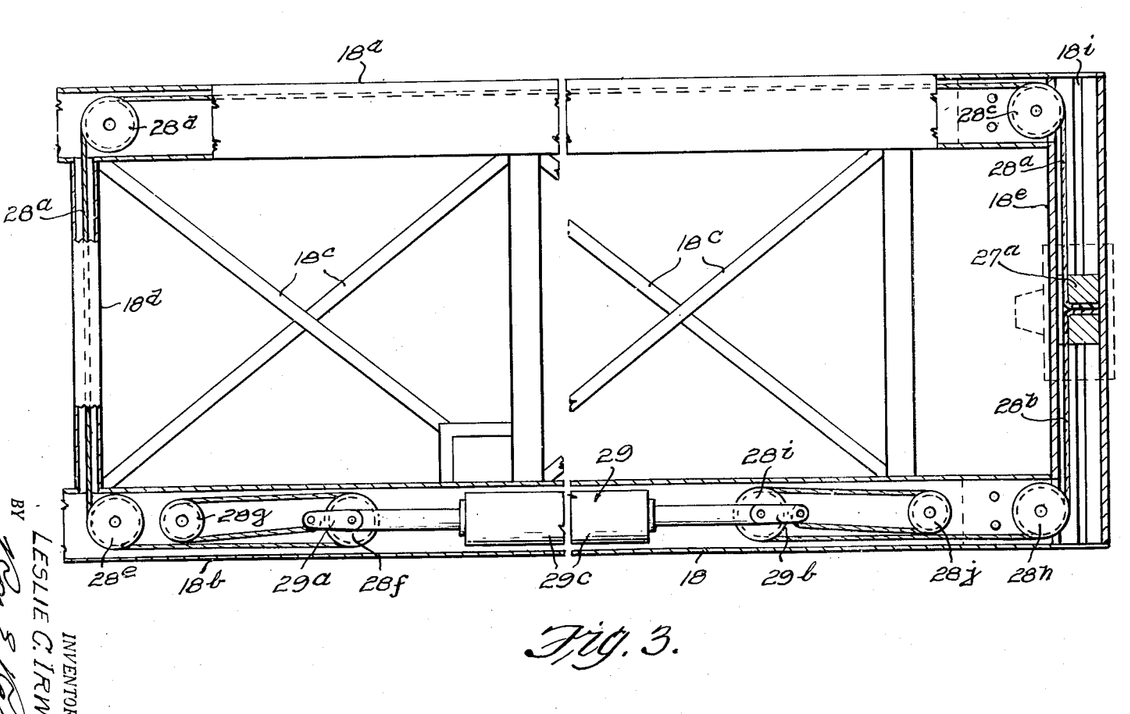
Fig. 3 is a view taken along line 3—3 of Fig. 1, showing certain parts broken away and certain other parts omitted.
Figure 4:
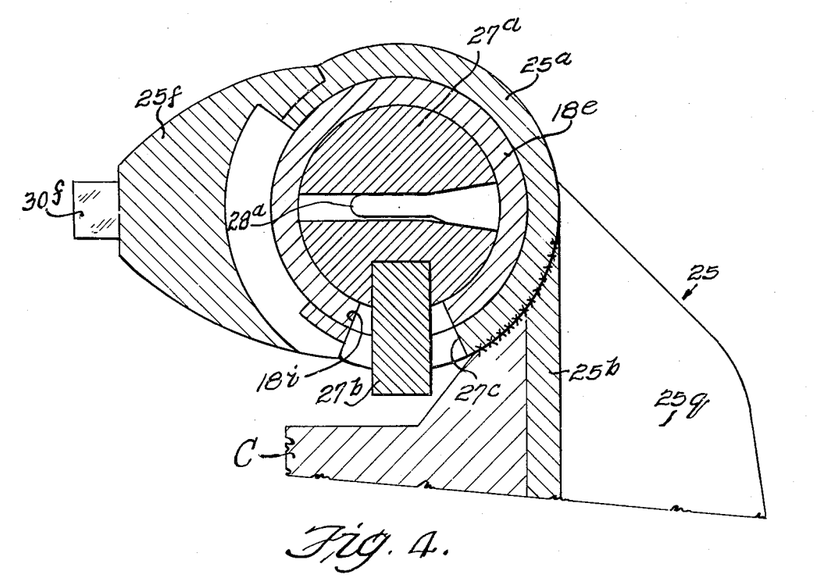
Fig. 4 is a fragmentary sectional view taken along line 4—4 of Fig. 9, but on a larger scale.

Referring particularly to Figs. 1 and 2, crane structure A is shown mounted on the side of car cradle B which may be similar to the cradle described in the aforementioned patent, the crane carrying baffle board C in an upright position when not in use, as indicated by the broken lines in Fig. 1, and at one side of box car D which in the present instance carries grain and which is centered on the cradle preparatory to emptying. After the grain doors of the car are removed, crane A is operated to extend board C through the car doorway E to the center of the car and rest it edgewise on the car floor, as shown in full lines in Fig. 1, and the board is of such length that it projects out the doorway so that it may swing against either side edge thereof by the weight of the grain flowing thereagainst. As mentioned previously, crane A' similar to crane A is mounted on the car cradle opposite crane A and when the boards C, C' are extended into the car they cooperate to form a V shape deflector, as illustrated schematically in Fig. 11.

Any suitable crane structure may be employed, and in the present embodiment it comprises a cant lever 10 formed of two side bars 10a, 10b, joined to a tubular member 10c at the lower ends and braced by struts 10d, 10e. Tubular member 10c is journaled on a shaft 12 supported at its ends by brackets 13 attached to two cradle frame members 14a, 14b. Cant lever 10 pivotally supports an L shape crane arm 18 on a shaft 10f carried by the upper ends of bars 10a, 10b, and the crane arm comprises two similar arm members 18a, 18b rigidly united by interconnecting braces 18c, and tubular braces 18d, 18e. The portions of members 18a, 18b projecting from pivot 10f and carrying the baffle board C are of hollow construction and preferably rectangular in cross section to accommodate certain power mechanism described hereinafter. Portions 18f, 18g of members 18a, 18b extend downwardly beyond pivot 10f, as viewed in Figs. 1, 2 and carry a shaft 18h to which power operated telescoping link units 20 are connected. These link units comprise slide members 20a, 20b which telescope into guide boxes 20c, 20d respectively, pivoted to a shaft 20e supported on cradle members 14a, 14b, and the slide members are moved longitudinally by piston rods 21a, 21b of two conventional hydraulic motors 21 which comprise cylinders 21c, 21d in which pistons connected to piston rods 21a, 21b reciprocate according to the application of hydraulic fluid in the cylinders as controlled by the operator. Since these motors and the hydraulic systems for operating the same are well known, further description thereof is deemed unnecessary. The closed ends of the cylinders are pivotally attached to a frame member 14c of cradle B. Slide members 20a, 20b are interconnected by a rod 20f, which extends through aligned slots 20g (only one of which appears in the drawings) formed in two opposite sides of boxes 20c, 20d, and the ends of piston rods 21a, 21b extend into longitudinal slots formed in the walls of both boxes and are connected to rod 20f.

Boxes 20c, 20d are swung about their pivots by the motors 21 and their relative rates of movement are controlled by two cam plates 22a, 22b fixedly supported on shafts 20e, 22c, the latter being rigidly attached to cradle members 14a, 14b through brackets, not shown. Rod 20f has rollers 20h, 20i thereon which ride on cam faces 22d, only one of which appears in the drawings, and the cam faces guide the rod in lateral movements relative to the movement of links 20a, 20b as the piston rods 21a, 21b move the rod in the slots 20g. The movement of cant lever 10 counterclockwise is limited by cables 23a, 23b which are attached to bars 10a, 10b respectively and the other ends of which are attached to the car cradle frame through shock absorbing springs 23c, 23d. When piston rods 21a, 21b are moved into their respective cylinders, the crane members assume the positions shown in dotted lines in Fig. 1, with the crane and board C to one side of the track and clear of the car on the cradle. When piston rods 21a, 21b are extended from their cylinders, cams 22a, 22b permit linkage 20 to be swung upwardly to raise cant lever 10 and then rotate crane arm 18 toward the car so that the board carrying end is inserted in the side door of the box car as shown in full lines in Fig. 1.

Preferably, two tension springs 18g, 18h interconnect the lower ends of crane arms 18 and shaft 20e to counterbalance the weight of the crane structure. beyond pivot shaft 10f.

Figures 5, 6, 7:
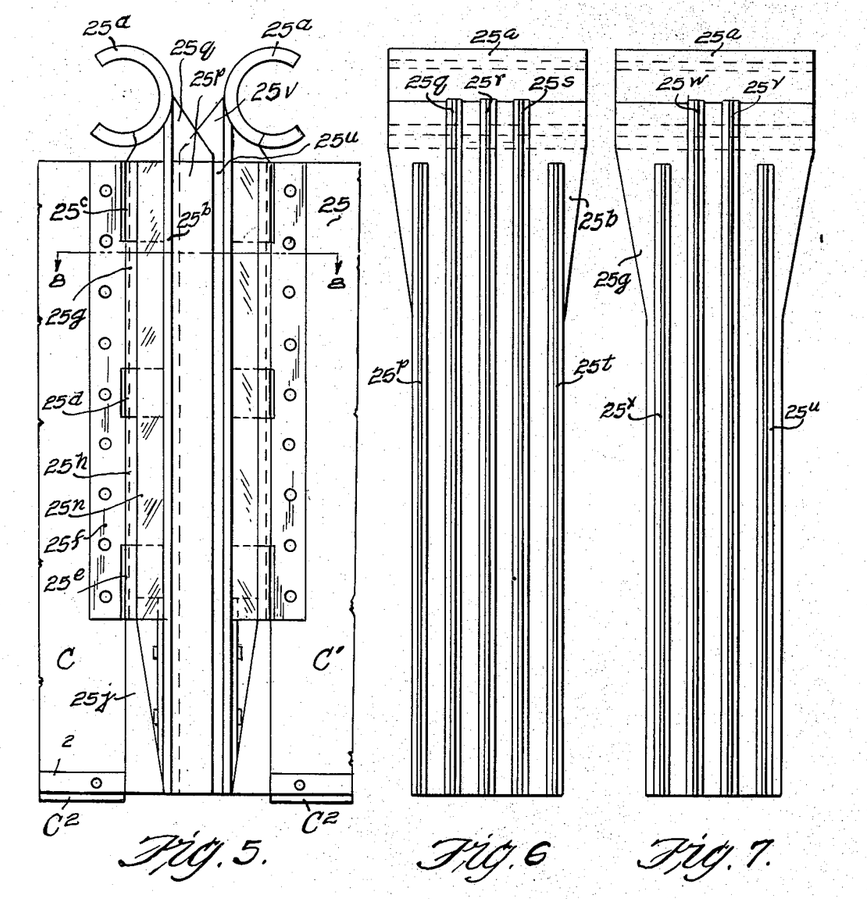
Fig. 5 is a fragmentary side elevational view showing the inner end portions of two baffle boards cooperating to form the apex of the grain deflector.
Figs. 6, 7 are elevational end views of the hinge members of the baffle boards shown in Fig. 5.

Baffle board C is supported on the end of crane arm 18 by a hinge mechanism 25 comprising a semi-tubular bearing section 25a which is slidingly supported on the tubular cross member 18e of the crane arm. A front plate 25b is attached to section 25a with the plane thereof parallel to the axis of section 25a, and the side thereof toward the crane structure has three longitudinally spaced, tubular hinge members 25c, 25d, 25e attached thereto, as best seen in Fig. 5, axially aligned and parallel to the front plate centerline. A hinge strap 25f is bolted to the deeper end of board C, which is preferably a steel plate tapering toward the end which is to project from the car doorway, and the strap has two tubular hinge sections 25g, 25h which fit closely between hinge sections 25c, 25d and 25e, respectively. A hinge rod 25i extends through the tubular hinge sections to pivotally secure the board C to the front plate. The hinge rod 25i is retained in position by a filler section 25j bolted to the front plate 25b immediately beneath hinge sections 25e. The filler section also forms a baffle between the lower portion of front plate 25b and the adjacent lower edge portion of board C and is curved adjacent to the board edge to maintain close spacing between the edges of the board and the filler section as the board swings on its hinge. Preferably, the major portions of the hinge members are closed by covers 25m, 25n to prevent interference by grain of the swing movement of board C.

Figure 8:
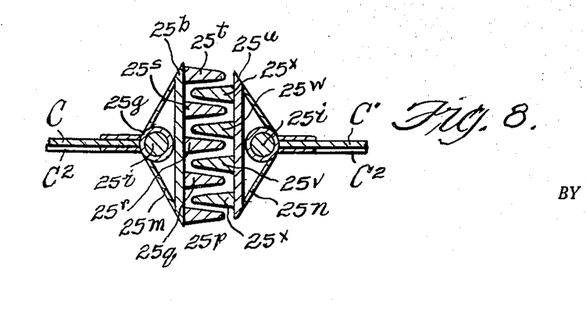
Fig. 8 is a fragmentary sectional view taken along line 8—8 of Fig. 5.

The outer face of front plate 25b has five longitudinally extending ribs 25p, 25q, 25r, 25s, 25t, the center three of which extend the entire length of the plate, and the outer two terminate short of the upper end. These ribs are spaced to provide four grooves to receive similar ribs 25u, 25v, 25w, 25x formed on the front plate 25b of the hinge mechanism of crane A' for baffle board C' so that when the baffle boards C, C' of the two structures are positioned inside the car the ribs interlock or mesh as is illustrated in Figs. 5 and 8 to form a tongue and groove type barrier against the passage of grain between the hinge mechanisms and to interlock the hinges so that the inner ends of the boards move as a unit, the purpose of which is explained hereinafter. Preferably, the outer edges of the ribs are beveled or rounded to facilitate intermeshing thereof.

Preferably, a resilient strip C2 is attached to the lower edges of boards C, C' to form a seal with the car floor to prevent flow of grain beneath the boards.

The hinge mechanism 25 is moved along cross member 18e of crane arm 18 by mechanism comprising a cylindrical block 27a which slides inside tubular cross member 18e and which is connected by a swivel joint to section 25a of hinge mechanism 25, which joint comprising a lug 27b thereon which projects through a longitudinal slot 18i formed lengthwise of the cross member. Lug 27b fits into a tapered opening 27c in bearing section 25a to provide for limited angular movement of baffle board C about the axis of cross member 18e so that the entire lower edges of the baffle board may engage the floors of various box cars although the floor elevation above the track may vary from car to car. Block 27a is moved inside cross member 18e by two cables 28a, 28b one end of which is secured in a central opening through the block and the other ends of which are attached to the ends of piston rods 29a, 29b of a hydraulic motor 29 which includes a cylinder 29c having a piston therein to which the two piston rods are attached. Cylinder 29c is connected by suitable hydraulic lines, not shown, to the hydraulic system mentioned previously which is under control of the operator so that the piston rods may be reciprocated as desired. As one piston rod is driven from the cylinder the other is correspondingly retracted. Cable 28a is reeved over fixed shives 28c, 28d, which are located inside the hollow member 18a, shive 28e, located inside member 18b, shive 28f carried on piston rod 29a and fixed shive 28g inside member 18b. Cable 28b is reeved over a fixed shive 28h inside member 18b, shive 28i carried on piston rod 29b and shive 28j fixedly pivoted inside member 18b. By this arrangement movement of piston rods 29a, 29b is amplified twice to move block 27a.

Figure 9:
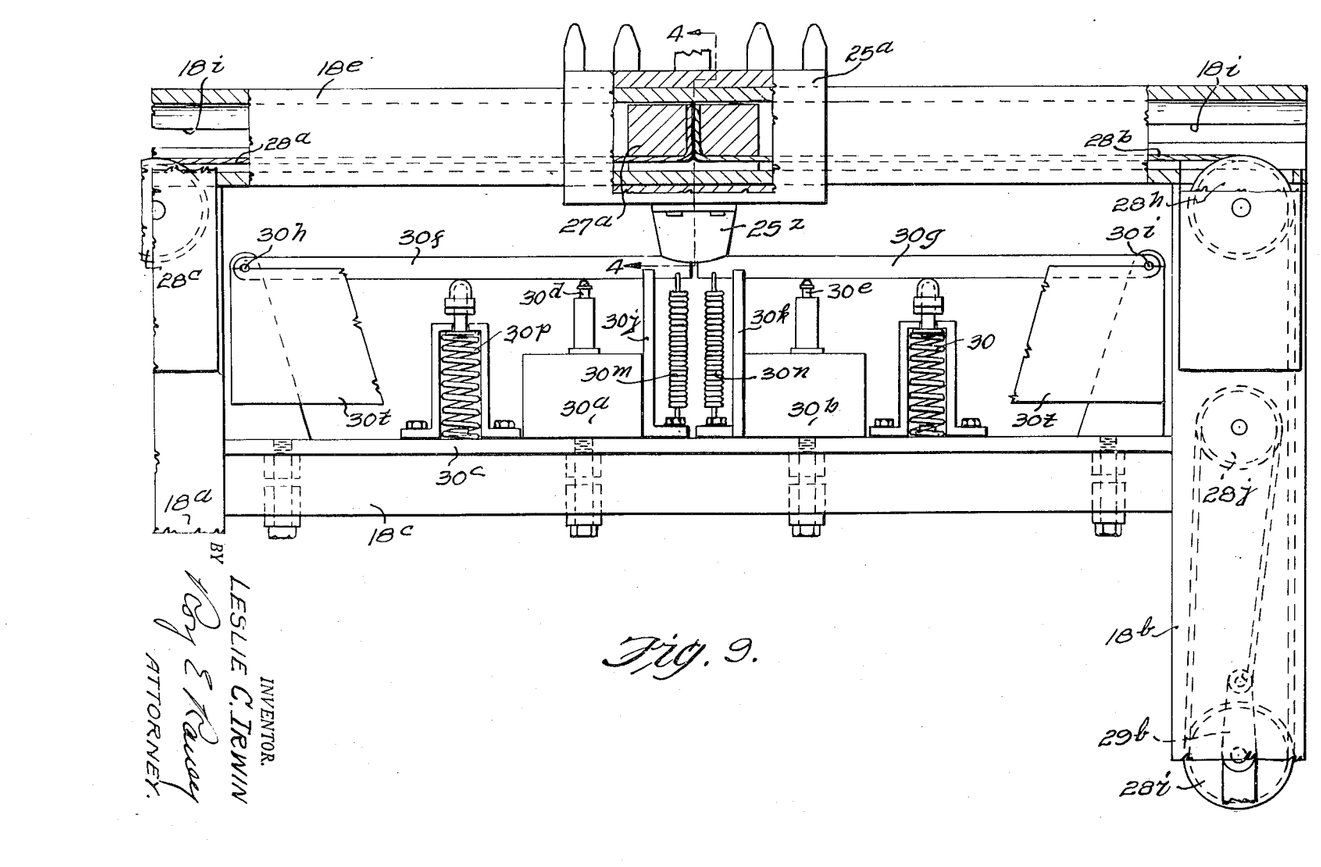
Fig. 9 is a top fragmentary view of a portion of the crane arm, certain parts being broken away or shown in section.
Figure 10:
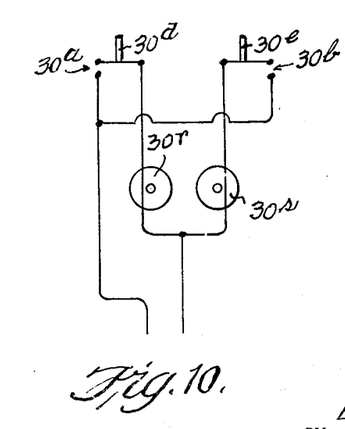
Fig. 10 is a wiring diagram of a position indicator for the baffle boards.

To facilitate centering of blocks 27a of both crane structures and properly align front plates 25b, 25u, of the hinge mechanisms, means are provided to indicate to the operator when the block 27a is in its mid position along cross member 18e. Referring to Figs. 9 and 10, this means comprises two normally open switches 30a, 30b; and as shown in Fig. 9 they are mounted on a base plate 30c attached to the brace member 18c adjacent to cross member 18e. Switches 30a, 30b have operating plungers 30d, 30e respectively which are depressable by bars 30f, 30g, respectively, the outer ends of which bars are pivoted on pins 30h, 30i carried on brackets attached to plate 30c as shown, and the bars are aligned with the plungers by U shape guides 30j, 30k attached to plate 30c. Tension springs 30m, 30n and compression springs 30p, 30q counterbalance bars 30a, 30b to maintain the bars in engagement with or in position to be engaged by a cam member 25z attached to the tubular section 25a of hinge mechanism 25. The inner ends of bars 30a, 30b are stepped inwardly or undercut so that when hinge mechanism 25 is centered on cross member 18e, cam 25z is engaged by the stepped surface of each bar and because the bars are urged towards the cam by springs 30p, 30q, plungers 30d, 30e are extended and the switches are open. The mechanism described is protected by a cover plate 30t. As may be seen in Fig. 10, switch 30a is connected in the circuit of a suitable indicator, such as a lamp 30r, and switch 30b is connected in the circuit of a lamp 30s, and as the hinge mechanism 25 moves toward the right, as viewed in Fig. 9, bar 30g is depressed by cam 25z and closes switch 30b to energize the circuit for lamp 30s. Likewise when the hinge mechanism is moved to the left, bar 30f is depressed which closes switch 30a and energizes the circuit for lamp 30r. Thus, the operator is appraised at all times as to the position of the hinge mechanism with respect to the center location thereof. It will be understood that the crane A' has a similar indicator for the hinge structure for board C'.

In unloading a grain car, the car is centrally positioned on the up-ending cradle of the dumper, the grain doors are removed and both crane structures A, A' are then operated as described to place boards C, C' thereof inside the car. The hinge mechanisms 25 have been centered on the cross members 18e of crane arms 18 before the boards C, C' are positioned so that the ribs on the front plates 25b, of the hinge mechanism interlock as described previously. Motors 29 are then operated to shift the hinge mechanisms 25 to the end of members 18e towards the end of the car which will be first up-ended and the cradle tilting mechanism is simultaneously operated to up-end the car. As the grain commences to flow from the elevated end of the car it forces the outer or free ends of the two boards C, C' against the lower edges of the side doorways respectively, as is illustrated schematically by the full lines in Fig. 11, and the boards thereby divert the flowing grain into the pit below the car cradle. After all grain has been discharged from one end of the car, the cradle is reversely tilted to up-end the opposite end and at the same time motors 29 of cranes A, A' are reversed to move both hinge mechanisms 25 to the opposite ends of cross members 18e, which will be towards the end of the car being elevated. The outer ends of the boards C, C' will then be moved by the flow of grain to the opposite edges of the respective car doorways as is illustrated by dotted lines in Fig. 11, and thereby divert the flowing grain into the pit below the car cradle. The car is then leveled and the hinge mechanisms are centered and the crane structures operated to withdraw the boards.

Figure 11:
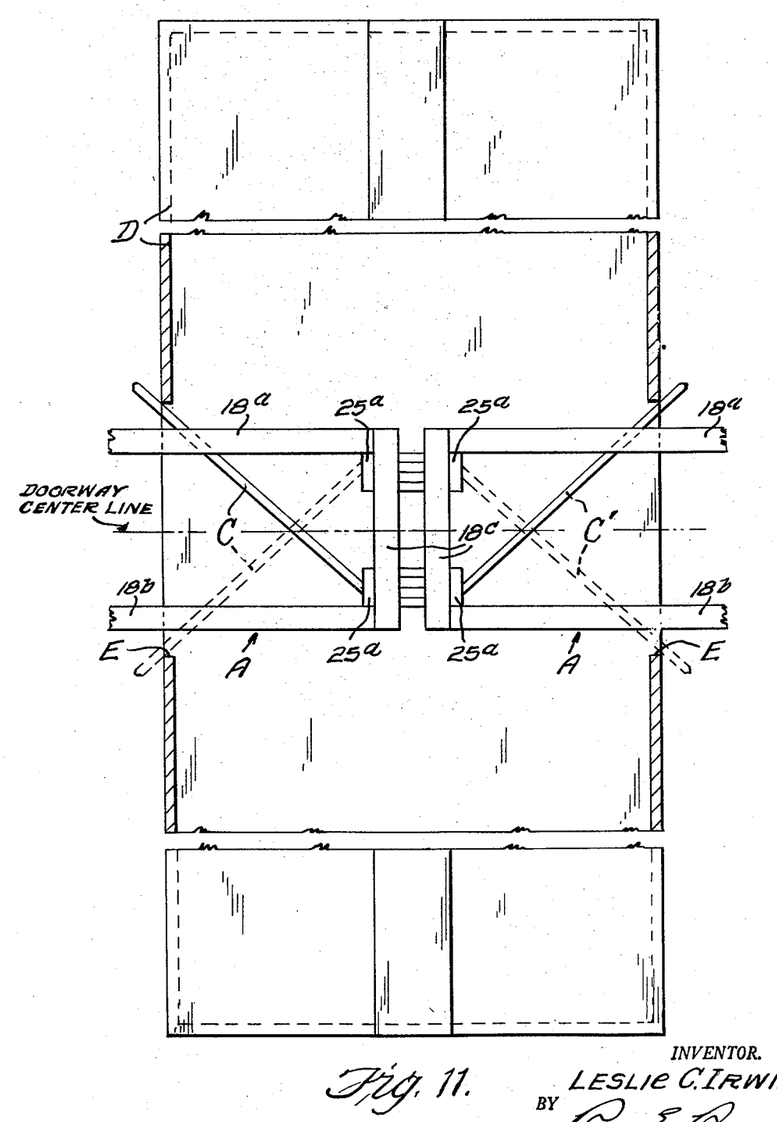
Fig. 11 is a schematic, top view partly in section of a railway car illustrating different relative positions of various parts of the deflector during unloading of the car.

It will be appreciated by referring to Fig. 11, that by shifting the hinge mechanisms to the opposite ends of members 18e as described, the angle at the apex of the deflector formed by baffle boards C, C' is considerably less than that in prior structures which have a fixed apex midway between the planes of the car doorway edges. In fact, the angle may be decreased in actual practice as much as 24° with five foot doorways and this reduction in angle greatly facilitates the flow of grain so that all grain is quickly diverted from the car by gravity.

By providing cooperating grain barrier members on the outer faces of the hinge mechanisms, no grain can pass between the inner ends of the boards C, C' but is deflected to flow from the car.

A further advantage of the inter-locking ribs on the hinge mechanisms described is that the hinge mechanisms are thereby maintained aligned during the shifting movement thereof. The improved baffle board structure enables substantially all grain to flow from the box car so that hand removal of grain is unnecessary whereby a minimum of time is required to unload the car.

Although but one form of the invention has been shown and described, it will be understood that other forms, modifications and adaptations may be made without departing from the scope of the invention as defined in the claims which follow.

I claim:

1. A deflector for diverting flowing material out of the side doorway of a railway car or the like comprising, a crane arm extendable through a side doorway into a box car to approximately the longitudinal center line of the car, a baffle board for deflecting flow of material in the car, means pivotally attaching one end of said baffle board to the outer end of said crane arm, said board extending from the center line of the car to the side doorway of the car and being pivoted by said attaching means to permit the unattached end of said baffle board to shift from adjacent to one side of the car doorway to the other, and means to shift the pivoted end of said board along the center line of the car.

2. A deflector for diverting flowing material out of the side doorway of a railway box car or the like comprising, a baffle board, a crane supporting said board and adapted to be extended inside a box car or the like through a side doorway of the car and to position said board substantially normal to the floor of the car with the inner end thereof adjacent the longitudinal center line of the car and the outer end extending to a side doorway of the car, said crane having a guide member extending in a direction longitudinally of the car when said crane is extended into the car to position said board therein, means pivotally attaching the inner end of said board to said guide member to permit the outer end of said baffle board to shift from adjacent to one side of the car doorway to the other, and power means to shift the inner end of said board along said guide member.

3. A deflector as defined in claim 2 including remote indicating means to indicate the position of the inner end of said board relative to said guide member.

4. A deflector for diverting flowing material out of the side doorways of a railway car or the like comprising, a crane arm extendable through a side doorway into a box car to approximately the longitudinal center line of the car, a baffle board for deflecting flow of material in the car, a hinge structure carried by said crane arm and pivotally attached to one end of said baffle board to pivotally support said board relative to said crane arm, said board extending from the center line of the car to the side doorway of the car, and means to shift said hinge structure along the center line of the car.

5. A deflector for diverting flowing material out of the side doorways of a railway car or the like comprising, a crane arm extendable through a side doorway into a box car to approximately the longitudinal center line of the car, a baffle board for deflecting flow of material in the car, a hinge structure carried by said crane arm and comprising a plate supported upright relative to the car floor and pivotally attached to one end of said baffle board to support said board relative to said crane arm, said board extending from the center line of the car to the side doorway of the car, and means to selectively shift said hinge structure along the center line of the car.

6. A deflector for diverting flowing material out of the side doorways of a railway box car or the like comprising, a pair of baffle boards, means to support said boards substantially normal to the floor of the car with the inner ends thereof adjacent to the longitudinal center line of the car and the outer ends extending to the edges of opposite side doorways respectively, of the car, means to pivot the inner ends of said boards to permit the outer ends thereof to shift adjacent to one side of the respective doorways to the other, and power means to shift the inner pivoted ends of said boards in unison along the longitudinal centerline of the car.

7. A deflector for diverting flowing material out of the side doorways of a railway box car or the like comprising, a pair of baffle boards, a pair of cranes supporting said boards respectively and adapted to be extended inside a box car or the like through opposite side doorways of the car and to position said boards substantially normal to the floor of the car with the inner ends thereof adjacent to the longitudinal center line of the car and the outer ends extending to the edge of the side doorway through which the respective cranes extend, said cranes each having a guide member extending in a direction longitudinally of the car when the respective cranes are extended into the car to position said boards therein, means pivotally attaching the inner end of said board to said guide member to permit the outer ends of said boards to shift from adjacent to one side of the respective doorways to the other, and power means to shift the inner ends of said boards along said guide members.

8. A deflector for diverting flowing material out of the side doorways of a railway box car or the like comprising, a pair of baffle boards, a pair of cranes carrying the respective boards and adapted to be extended inside a box car or the like through opposite side doorways of the car and to position said boards substantially normal to the floor of the car with the inner ends thereof adjacent the longitudinal center line of the car and the outer ends extending to the edge of the side doorway through which the respective cranes extend, said cranes each having a guide member extending in a direction longitudinally of the car when the respective cranes are extended into the car to position said boards therein, hinge means pivotally attaching the inner ends of said boards to said guide members to permit the outer ends of said boards to shift from adjacent to one side of the respective doorways to the other, said hinge means on the respective cranes having interengaging faces extending substantially the entire length of the adjacent inner end edges of said boards, and power means to shift said hinge means in unison along said guide members.

9. A deflector for diverting flowing material out of the side doorway of a railway box car or the like comprising, a baffle board, a crane supporting said board and adapted to be extended inside a box car or the like through a side doorway of the car and to position said board substantially normal to the floor of the car with the inner end thereof adjacent the longitudinal center line of the car and the outer end extending to a side doorway of the car, said crane comprising two spaced arms having a guide member extending between said arms and in a direction longitudinally of the car when said crane is extended into the car to position said board therein, means pivotally attaching the inner end of said board to said guide member to permit the outer end of said baffle board to shift from adjacent to one side of the car doorway to the other, and power means inside one of said arms to shift the pivoted end of said board along said member.

10. A deflector for diverting flowing material out of the side doorway of a railway car or the like comprising, a support structure extendable through a side doorway into the box car to approximately the longitudinal centerline of the car, a baffle board for deflecting flowing material in the car, means pivotally attaching one end of said baffle board to said structure to pivotally support said one end of said baffle board adjacent to the centerline of the car, said board extending from said pivoted end to the side doorway of the car, said attaching means permitting the unattached end of said baffle board to shift from adjacent to one side of the car doorway to the other, and means to move said attaching means in opposite directions relative to said support structure to shift said attaching means along the centerline of the car to shift said pivoted end of said board.

11. A deflector for diverting flowing material out of the side doorways of a railway box car or the like comprising a pair of baffle boards, a pair of supporting structures for the respective baffle boards, said structures adapted to be extended inside of the box car to opposite side doorways of the car and to position said board normal to the floor of the car with the inner ends thereof adjacent to the longitudinal centerline of the car, the outer ends of said boards extending to either edge of doorways through which the respective structures extend, said structures each having a guide member extending in a direction longitudinally of the car when the respective structures are extended into the car to position said boards therein, means on said guide members pivotally attaching the inner ends of the respective baffle boards to said structures to permit the outer ends of said boards to shift from adjacent to one side of the respective doorways to the other, and power means to shift the pivotal attaching means along said guide members.

References Cited in the file of this patent

UNITED STATES PATENTS

| | | |
|---|---|---|
| 1,542,951 | Perkins | June 23, 1925 |
| 2,099,071 | Lundbye | Nov. 16, 1937 |
| 2,797,000 | Winter | June 25, 1957 |